(12) United States Patent
Lee

(10) Patent No.: US 10,846,002 B2
(45) Date of Patent: Nov. 24, 2020

(54) MEMORY CONTROLLER TO ADJUST THE SIZE OF WRITE DATA, OPERATING METHOD THEROF AND STORAGE DEVICE INCLUDING THE SAME

(71) Applicant: SK hynix Inc., Gyeonggi-do (KR)

(72) Inventor: Joo Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 14 days.

(21) Appl. No.: 16/204,138

(22) Filed: Nov. 29, 2018

(65) Prior Publication Data

US 2019/0324670 A1    Oct. 24, 2019

(30) Foreign Application Priority Data

Apr. 23, 2018  (KR) .......................... 10-2018-0046828

(51) Int. Cl.
  *G06F 12/00* (2006.01)
  *G06F 3/06* (2006.01)
  *G06F 12/02* (2006.01)
  *G06F 13/00* (2006.01)
  *G06F 13/28* (2006.01)

(52) U.S. Cl.
  CPC ............ *G06F 3/0631* (2013.01); *G06F 3/061* (2013.01); *G06F 3/064* (2013.01); *G06F 3/0688* (2013.01); *G06F 12/0246* (2013.01); *G06F 2212/7202* (2013.01)

(58) Field of Classification Search
  CPC ...... G06F 3/0631; G06F 3/064; G06F 3/0688; G06F 12/0246; G06F 3/061; G06F 2212/7202
  See application file for complete search history.

(56) References Cited

U.S. PATENT DOCUMENTS

| | | | |
|---|---|---|---|
| 8,572,311 B1 * | 10/2013 | Shalvi | G06F 11/14 711/103 |
| 9,239,781 B2 * | 1/2016 | Jones | G06F 12/0246 |
| 2010/0228940 A1 * | 9/2010 | Asnaashari | G06F 12/0246 711/170 |
| 2014/0156966 A1 * | 6/2014 | Ellis | G06F 3/064 711/173 |
| 2019/0129841 A1 * | 5/2019 | Kanno | G06F 3/0614 |
| 2019/0205043 A1 * | 7/2019 | Huang | G06F 3/0619 |

FOREIGN PATENT DOCUMENTS

| | | |
|---|---|---|
| KR | 1020160112135 | 9/2016 |
| KR | 1020160127524 | 11/2016 |

* cited by examiner

*Primary Examiner* — Mark A Giardino, Jr.
(74) *Attorney, Agent, or Firm* — IP & T Group LLP

(57) ABSTRACT

A storage device having an improved operation speed includes: a plurality of memory devices each including a plurality of memory blocks; and a memory controller configured to allocate a super block including at least two memory blocks included in different memory devices among the plurality of memory blocks, read state information in a memory block state information table indicating whether each of the plurality of memory blocks is a bad block or a normal block, and adjust the size of write data that is data to be stored in a selected stripe among a plurality of stripes included in the super block, based on the state information in the memory block state information table.

19 Claims, 13 Drawing Sheets

FIG. 8

MEMORY BLOCK STATE INFORMATION { 0 = NORMAL BLOCK }
{ 1 = BAD BLOCK }

| BLK # | STATE INFORMATION |
|-------|-------------------|
| BLK1  | 0                 |
| BLK2  | 0                 |
| BLK3  | 1                 |
| BLK4  | 0                 |
| ⋮     | ⋮                 |
| BLKz  | 0                 |

FIG. 9

{ NUMBER OF PAGES PER MEMORY BLOCK = 128 }
{ NUMBER OF PROGRAM (NOP) PER PAGE = 4 }

Super Block 0

BLK_0: NORMAL BLOCK
BLK_1: BAD BLOCK
BLK_2: NORMAL BLOCK
BLK_3: NORMAL BLOCK

|                 | NOP              |
|-----------------|------------------|
| BLK_0 (NORMAL)  | 512              |
| BLK_1 (BAD)     | 512              |
| BLK_2 (NORMAL)  | 512              |
| BLK_3 (NORMAL)  | 512              |
| Super Block 0   | 512 x 3 = 1536   |

MEMORY CONTROLLER TO ADJUST THE SIZE OF WRITE DATA, OPERATING METHOD THEROF AND STORAGE DEVICE INCLUDING THE SAME

CROSS-REFERENCE TO RELATED APPLICATION

The present application claims priority under 35 U.S.C. § 119(a) to Korean patent application number 10-2018-0046828, filed on Apr. 23, 2018, which is incorporated herein by reference in its entirety.

BACKGROUND

Field of Invention

Various embodiments of the present disclosure generally relate to an electronic device. Particularly, the embodiments relate to a storage device and an operating method thereof.

Description of Related Art

A storage device is a device the stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and the stored data is lost when the supply of power is interrupted. The volatile memory device may include a Static Random Access Memory (SRAM), a Dynamic Random Access Memory (DRAM), and the like.

The nonvolatile memory device is a memory device in which data is retained even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a storage device having an improved operation speed and an operating method thereof.

According to an aspect of the present disclosure, there is provided a storage device including: a plurality of memory devices each including a plurality of memory blocks; and a memory controller configured to allocate a super block including at least two memory blocks included in different memory devices among the plurality of memory blocks, read state information in a memory block state information table indicating whether each of the plurality of memory blocks is a bad block or a normal block, and adjust the size of write data that is data to be stored in a selected stripe among a plurality of stripes included in the super block, based on the state information in the memory block state information table.

According to another aspect of the present disclosure, there is provided a memory controller including: a memory interface configured to communicate data with a plurality of memory devices each including a plurality of memory blocks; and a write control circuit configured to allocate a super block including at least two memory blocks included in different memory devices among the plurality of memory blocks, read state information in a memory block state information table indicating whether each of the plurality of memory blocks is a bad block or a normal block, and adjust the size of write data that is data to be stored in a selected stripe among a plurality of stripes included in the super block, based on the state information in the memory block state information table.

According to still another aspect of the present disclosure, there is provided a method for operating a memory controller for controlling a plurality of memory devices each including a plurality of memory blocks, the method including: allocating a plurality of super blocks each including at least two memory blocks included in different memory devices among the plurality of memory blocks; and adjusting the size of write data that is data to be stored in a selected stripe among a plurality of stripes included in the super block, based on state information in a memory block state information table indicating whether each of the plurality of memory blocks is a bad block or a normal block.

According to still another aspect of the present disclosure, there is provided A memory system comprising: a plurality of memory devices including a plurality of stripes each having a plurality of pages respectively therefrom; and a controller configured to: detect an available space of a selected stripe based on a Number of Program (NOP) per page, a data write position, and statuses of the pages; dynamically determine a data size to be stored in the selected stripe according to the available space of the selected stripe; and control the memory devices to perform a write operation of storing write data as many as the determined data size into the available space in the selected stripe.

BRIEF DESCRIPTION OF THE DRAWINGS

Various embodiments will now be described in more detail hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions of the figures may be exaggerated for clarity of illustration. It will be understood that when an element is referred to as being "between" two elements, it can be the only element between the two elements, or one or more intervening elements may also be present. Like reference numerals refer to like elements throughout.

FIG. 8 is a diagram illustrating a memory block state information table of FIG. 1 according to an embodiment of the present disclosure.

FIG. 9 is a diagram illustrating an NOP of a super block according to an embodiment of the present disclosure.

DETAILED DESCRIPTION

Figure 1:
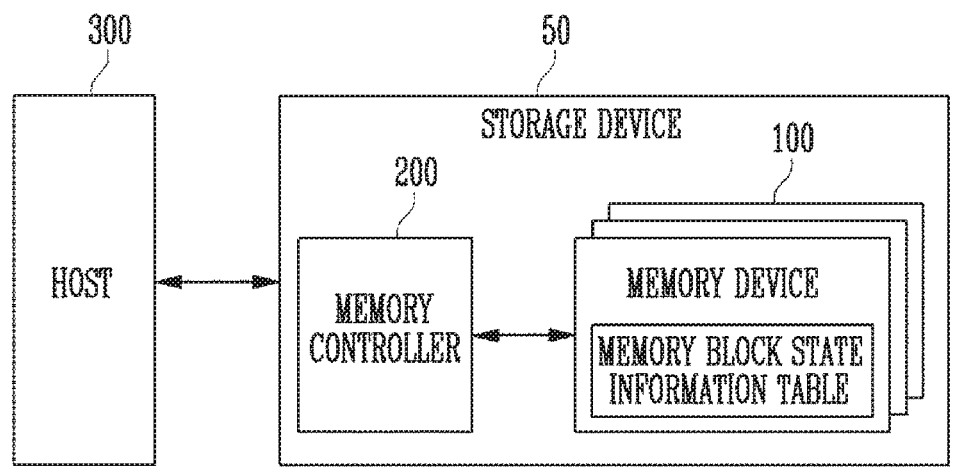
FIG. 1 is a diagram illustrating a storage device according to an embodiment of the present invention.

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

The embodiments according to the concept of the present disclosure can be variously modified and have various shapes. Thus, the embodiments are illustrated in the drawings and are intended to be described herein in detail. However, the embodiments according to the concept of the present disclosure are not construed as limited to specified disclosures, and include all changes, equivalents, or substitutes that do not depart from the spirit and technical scope of the present disclosure.

While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Meanwhile, other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

All terms used herein including technical or scientific terminologies have meanings that they are commonly understood by those skilled in the art to which the present disclosure pertains, unless defined otherwise or clearly indicated in the specification. The terms having the definitions as defined in the dictionary should be understood such that they have meanings consistent with the context of the related technique. Terms should not be understood in an ideally or excessively formal way, unless defined otherwise or clearly indicated in the specification.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

The terminology used herein is for the purpose of describing particular embodiments only and is not intended to be limiting of the present invention.

As used herein, singular forms may include the plural forms as well and vice versa, unless the context clearly indicates otherwise.

It is noted that reference to "an embodiment" does not necessarily mean only one embodiment, and different references to "an embodiment" are not necessarily to the same embodiment(s).

Hereinafter, exemplary embodiments of the present disclosure will be described in detail with reference to the accompanying drawings in order for those skilled in the art to be able to readily implement the technical spirit of the present disclosure.

FIG. 1 is a diagram illustrating a storage device 50.

Referring to FIG. 1, the storage device 50 may be a device for storing data under the control of a host 300. Non-limiting examples of the host 300 may include a mobile phone, a smart phone, an MP3 player, a laptop computer, a desktop computer, a game console, a TV, a tablet PC or an in-vehicle infotainment.

The storage device 50 may be implemented as any one of various types of storage devices according to a host interface that is a communication scheme with the host 300. For example, the storage device 50 may be implemented with any one of various types of storage devices such as a multi-media card of a Solid State Drive (SSD), a Multi-Media Card (MMC), an embedded, Multi-Media Card (eMMC), a Reduced Size, Multi-Media Card (RS-MMC), and a micro-Multi-Media Card (micro-MMC) type, a Secure Digital (SD) card of a Secure Digital (SD), a mini-Secure Digital (mini-SD) and a micro-Secure Digital (micro-SD) type, an Universal Storage Bus (USB) storage device, a Universal Flash Storage (UFS) device, a storage device of a Personal Computer Memory Card International Association (PCMCIA) card type, a storage device of a Peripheral Component Interconnection (PCI) card type, a storage device of a PCI-express (PCI-e or PCIe) card type, a Compact Flash (CF) card, a smart media card, and a memory stick.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The storage device 50 may include a memory controller 200 and a memory device 100. The memory device 100 may store data. The memory device 100 may operate under the control of the memory controller 200. The memory device 100 may include a memory cell array (shown in FIG. 3) including a plurality of memory cells for storing data. The memory cell array may include a plurality of memory blocks (for example, BLK1 to BLKz shown in FIG. 3). Each memory block may include a plurality of memory cells. One memory block may include a plurality of pages. In some embodiments, the page may be a unit for storing data or reading data stored in the memory device 100. The memory block may be a unit for erasing data. By way of example and not limitation, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (Sri-RAM), or the like. In this specification, for convenience of description, a case where the memory device 100 is a NAND flash memory is assumed and described.

The memory device 100 may be configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

In an embodiment, the memory device 100 may include a memory block state information table. The memory block state information table may include information on states of a plurality of memory blocks. Specifically, the memory block state information table may include information indicating whether a memory block is a bad block or a normal block. In an embodiment, the memory block state information table may include information indicating, as a bit map, whether a memory block is a bad block or a normal block.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is stored.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear-leveling and a program operation for garbage collection.

In an embodiment, the memory controller 200 may control at least two memory devices 100. The memory controller 200 may control the memory devices according to an interleaving scheme so as to improve operational performance.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCI-e or PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
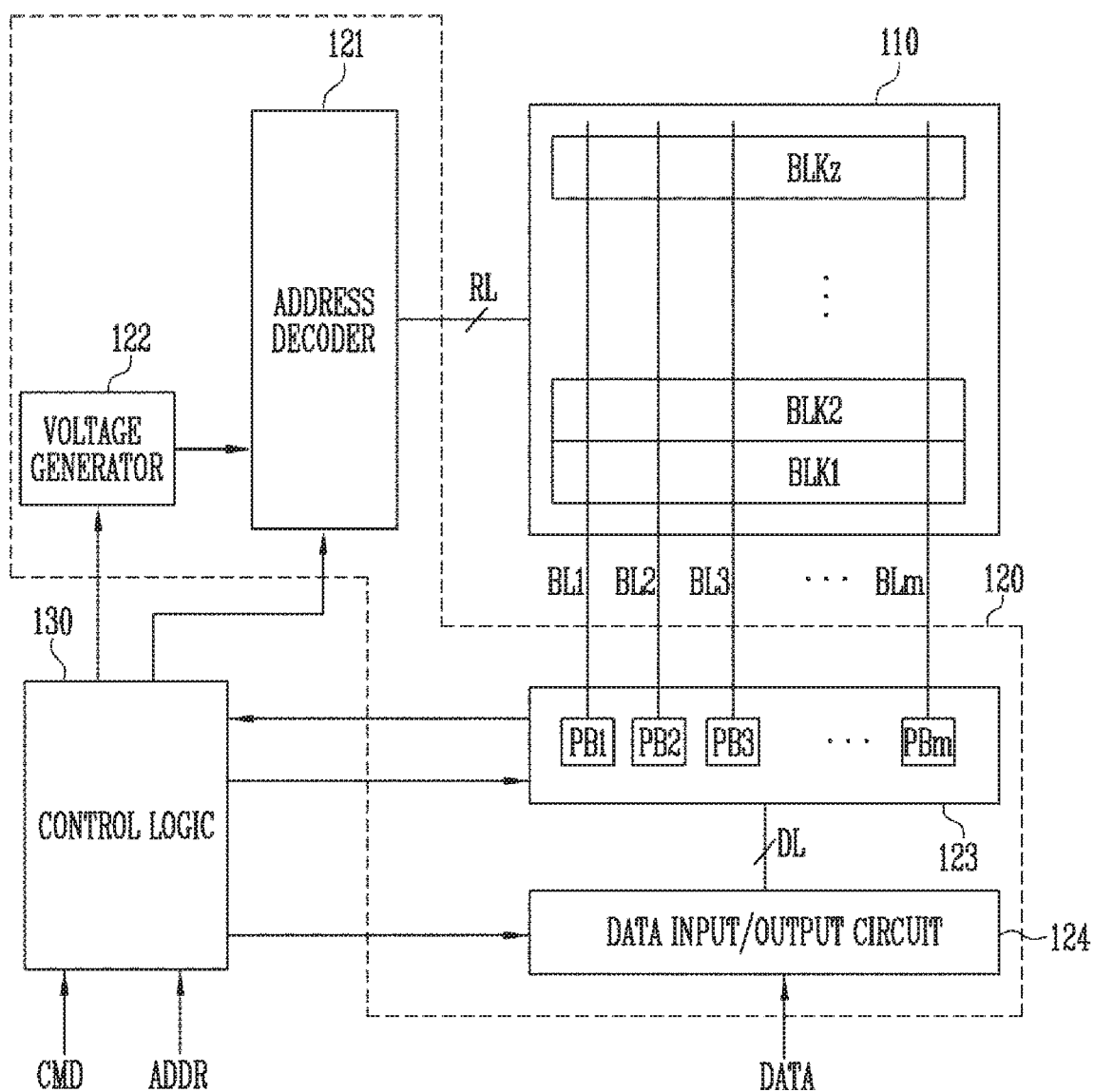
FIG. 2 is a diagram illustrating a memory device of FIG. 1.

FIG. 2 is a diagram illustrating a memory device, for example, the memory device 100 of FIG. 1.

Referring to FIG. 2, the memory device 100 may include a memory cell array 100, a peripheral circuit 120, and a control logic 130.

The memory cell array 110 may include a plurality of memory blocks BLK1 to BLKz. The plurality of memory blocks BLK1 to BLKz are coupled to an address decoder 121 through row lines RL. The plurality of memory blocks BLK1 to BLKz are coupled to a read/write circuit 123 through bit lines BL1 to BLm. Each of the plurality of memory blocks BLK1 to BLKz includes a plurality of memory cells.

A memory block may be divided into a user block for storing user data and a system block for storing system data. The user block may be divided into a free block or a data block according to whether data is stored. The free block may be a block that does not store any data and is empty. The data block may be a block in which data is stored. The data stored in the data block may be divided into valid data and invalid data.

A block that cannot store any data among the memory blocks may be referred to as a bad block. The bad block may be divided into a Manufacture Bad Block (MBB) in which a bad block occurs during the manufacturing of the memory device 100, and a Growing Bad Block (GBB) in which a bad block occurs after using a memory block, according to a point of time when the bad block occurs. In an embodiment, when memory blocks in which data is stored are read, a memory block in which an uncorrectable error occurs may be the GBB.

In an embodiment, the memory block state information table described with reference to FIG. 1 may be stored in the system block. The memory device 100 may provide the information in the memory block state information table in response to a request from an external controller (not shown).

Each memory block may include a plurality of memory cells for storing data. In an embodiment, the plurality of memory cells may be nonvolatile memory cells. Among the plurality of memory cells, memory cells coupled to the same word line may be defined as one page. That is, the memory cell array 110 may include a plurality of pages. In an embodiment, each of the plurality of memory blocks BLK1 to BLKz included in the memory cell array 110 may include a plurality of dummy cells. One or more dummy cells may be coupled in series between a drain select transistor and memory cells. In addition, one or more dummy cells may be coupled in series between a source select transistor and the memory cells.

Each of the memory cells of the memory device 100 may be a single level cell (SLC) for storing one data bit, a multi-level cell (MLC) for storing two data bits, a triple level cell (TLC) for storing three data bits, or a quad level cell (QLC) for storing four data bits.

The peripheral circuit 120 may include the address decoder 121, a voltage generator 122, the read/write circuit 123, and a data input/output circuit 124.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate in response to the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address in the received address ADDR. The address decoder 121 may select at least one word line WL among word lines input to the selected memory block by applying voltages provided from the voltage generator 122 to the word line WL according to the decoded row address.

In a program operation, the address decoder 121 may apply a program voltage to the selected word line, and apply a program pass voltage having a level lower than that of the program voltage to unselected word lines. In a program verify operation, the address decoder 121 may apply a verify voltage to the selected word line, and apply a verify pass voltage higher than the verify voltage to the unselected word lines. In a read operation, the address decoder 121 may apply a read voltage to the selected word line, and apply a pass voltage higher than the read voltage to the unselected word lines.

In an embodiment, an erase operation of the memory device 100 is performed in units of memory blocks. In an erase operation, the address ADDR input to the memory device 100 includes a block address. The address decoder 121 may decode the block address and select at least one memory block among the memory blocks BLK1 to BLKz according to the decoded block address. In the erase operation, the address decoder 121 may apply a ground voltage to word lines coupled to the selected memory block.

In an embodiment, the address decoder 121 may decode a column address in the address ADDR transmitted thereto. The Decoded Column Address (DCA) may be transmitted to the read/write circuit 123. As an example, the address decoder 121 may include components such as a row decoder, a column decoder, and an address buffer.

The voltage generator 122 may generate a plurality of voltages by using an external power voltage supplied to the memory device 100. The voltage generator 122 operates in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage. The voltage generator 122 may be configured to generate various voltages required by the memory device 100. For example, the voltage generator 122 may generate a plurality of program voltages, a plurality of pass voltages, a plurality of select read voltages or a plurality of unselect read voltages.

For example, the voltage generator 122 may include a plurality of pumping capacitors for receiving the internal power voltage, and generate a plurality of voltages by selectively activating the plurality of pumping capacitors under the control of the control logic 130. The plurality of generated voltages may be supplied to the memory cell array 110 by the address decoder 121.

The read/write circuit 123 may include first to mth page buffers PB1 to PBm (where m is a positive integer). The first to mth page buffers PB1 to PBm are coupled to the memory cell array 110 through the respective first to mth bit lines BL1 to BLm. The first to mth page buffers PB1 to PBm may operate under the control of the control logic 130.

The first to mth page buffers PB1 to PBm may communicate data with the data input/output circuit 124. In a program operation, the first to mth page buffers PB1 to PBm receive data DATA to be stored through the data input/output circuit 124 and data lines DL.

In the program operation, a program pulse may be applied to a selected word line according to a row address. The first to mth page buffers PB1 to PBm may transfer data DATA received through the data input/output circuit 124 to memory cells of the selected word line through the bit lines BL1 to BLm. At least one memory cell among the memory cells of the selected word line may be programmed according to the transferred data DATA. A threshold voltage of a memory cell coupled to a bit line to which a program allow voltage (e.g., a ground voltage) is applied may be increased. A threshold voltage of a memory cell coupled to a bit line to which a program inhibit voltage (e.g., a power voltage) is applied may be maintained.

In a program verify operation, the first to mth page buffers PB1 to PBm read page data from the memory cells of the selected word line through the bit lines BL1 to BLm.

In a read operation, the read/write circuit 123 reads page data DATA from the memory cells of the selected word line through the bit lines BL, and outputs the read page data DATA to the data input/output circuit 124.

In an erase operation, the read/write circuit 123 may allow the bit lines BL to be floated. In an embodiment, the read/write circuit 123 may include a column select circuit.

The data input/output circuit 124 is coupled to the first to mth page buffers PB1 to PBm through the data lines DL. The data input/output circuit 124 may operate under the control of the control logic 130.

The data input/output circuit 124 may include a plurality of input/output buffers (not shown) that receive input data. In a program operation, the data input/output circuit 124 may receive data DATA to be stored from an external controller (not shown). In a read operation, the data input/output circuit 124 outputs, to the external controller, data transmitted from the first to meth page buffers PB1 to PBm included in the read/write circuit 123.

The control logic 130 may be coupled to the address decoder 121, the voltage generator 122, the read/write circuit 123, and the data input/output circuit 124. The control logic 130 may be configured to control overall operations of the memory device 100. The control logic 130 may operate in response to a command CMD transmitted from an external device.

Figure 3:
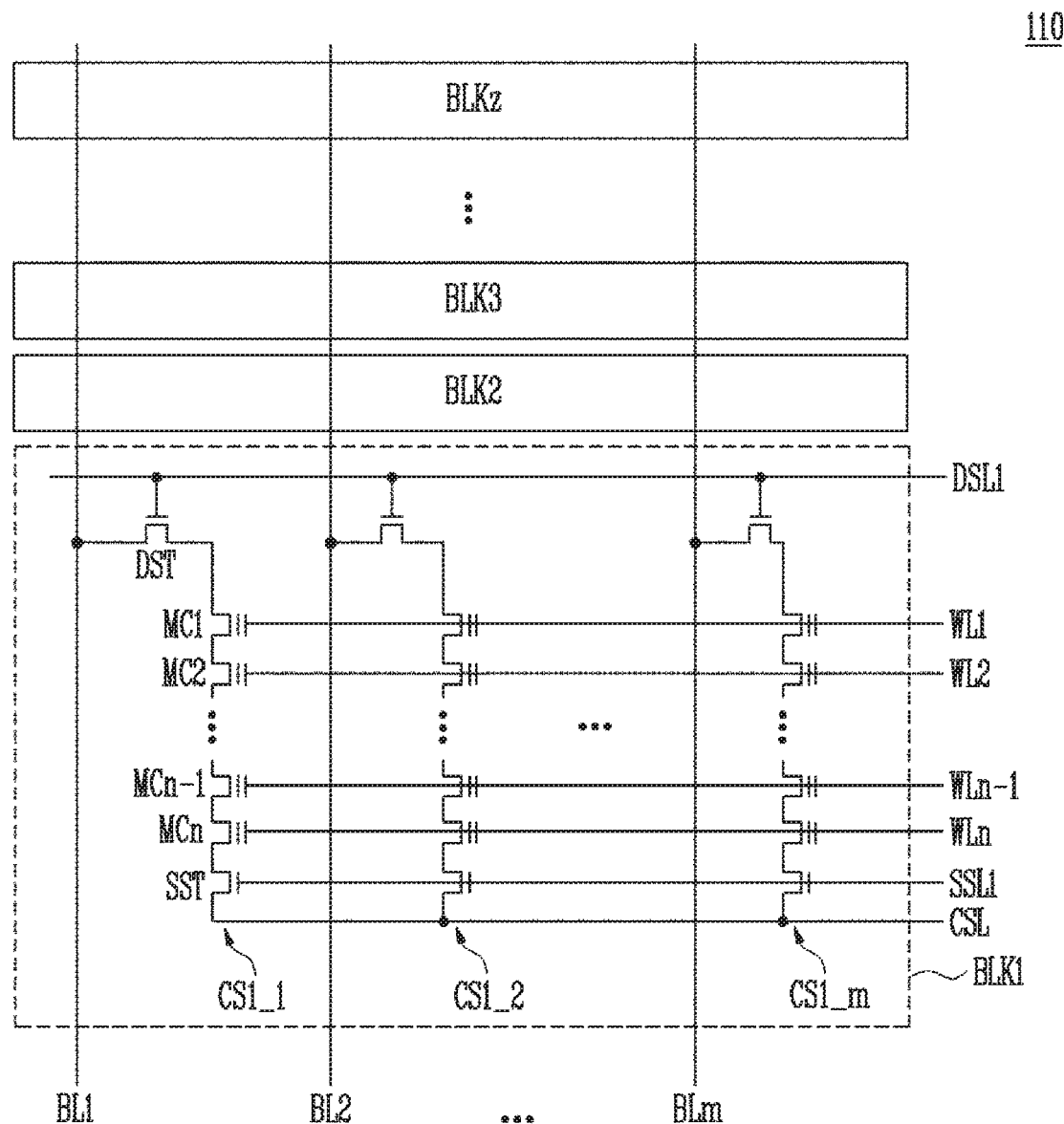
FIG. 3 is a diagram illustrating a memory cell array of FIG. 2.

FIG. 3 is a diagram illustrating a memory cell array, for example, the memory cell array 110 of FIG. 2.

Referring to FIG. 3, first to zth memory blocks BLK1 to BLKz are commonly coupled to first to mth bit lines BL1 to BLm. In FIG. 3, only the components included in the first memory block BLK1 among the plurality of memory blocks BLK1 to BLKz are illustrated. However, it is to be understood that each of the other memory blocks BLK2 to BLKz is configured similar to the first memory block BLK1, and so the descriptions of the components included in each of the other memory blocks BLK2 to BLKz are omitted for convenience of description.

The memory block BLK1 may include a plurality of cell strings CS1_1 to CS1_m (where m is a positive integer). First to mth cell strings CS1_1 to CS1_m are coupled to the first to mth bit lines, respectively. Each of the first to mth cell strings CS1_1 to CS1_m may include a drain select transistor DST, a plurality of memory cells MC1 to MCn (where n is a positive integer) coupled in series, and a source select transistor SST.

A gate terminal of the drain select transistor DST included in each of the first to mth cell strings CS1_1 to CS1_m is coupled to a drain select line DSL1. Gate terminals of first to nth memory cells MC1 to MCn included in each of the first to mth cell strings CS1_1 to CS1_m are coupled to first to nth word lines WL1 to WLn, respectively. A gate terminal of the source select transistor SST included in each of the first to mth cell strings CS1_1 to CS1_m is coupled to a source select line SSL1.

For convenience of description, the structure of a cell string will be described based on the first cell string CS1_1 among the plurality of cell strings CS1_1 to CS1_m. However, it will be understood that each of the other cell strings CS1_2 to CS1_m is configured similar to the first cell string CS1_1.

A drain terminal of the drain select transistor DST included in the first cell string CS1_1 is coupled to the first bit line BL1. A source terminal of the drain select transistor DST included in the first cell string CS1_1 is coupled to a drain terminal of the first memory cell MC1 included in the first cell string CS1_1. The first to nth memory cells MC1 to MCn are coupled in series to each other. A drain terminal of the source select transistor SST included in the first cell string CS1_1 is coupled to a source terminal of the nth memory cell MCn included in the first cell string CS1_1. A source terminal of the source select transistor SST included in the first cell string CS1_1 is coupled to a common source line CSL. In an embodiment, the common source line CSL may be commonly coupled to the first to zth memory blocks BLK1 to BLKz.

The drain select line DSL1, the first to nth word lines WL1 to WLn, and the source select line SSL1 are included in the row lines RL of FIG. 2. The drain select line DSL1, the first to nth word lines WL1 to WLn, and the source select line SSL1 are controlled by the address decoder 121. The common source line CSL may operate under the control of the control logic 130. The first to mth bit lines BL1 to BLm are controlled by the read/write circuit 123.

Figure 4:
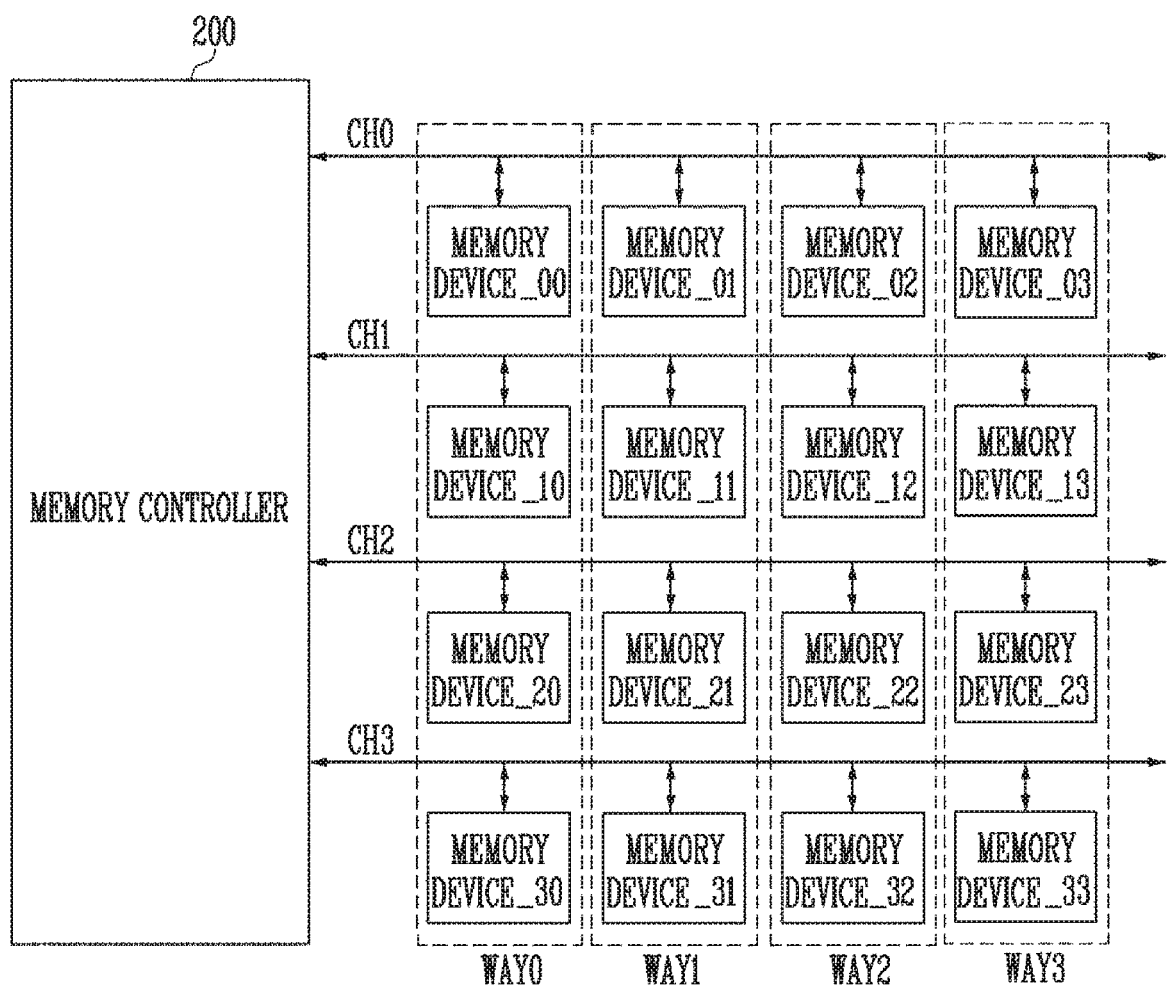
FIG. 4 is a block diagram exemplarily illustrating a coupling relationship between a memory controller of FIG. 1 and a plurality of memory devices.

FIG. 4 is a block diagram exemplarily illustrating a coupling relationship between the memory controller, for example the memory controller 200 of FIG. 1, and a plurality of memory devices.

Referring to FIG. 4, the memory controller 200 may be coupled to a plurality of memory devices (e.g., memory device_00 to memory device_33) through a plurality of channels CH0 to CH3. However, the present invention is not limited thereto. For example, the number of memory devices and the number of channels may vary depending on design. That is, in an embodiment, it will be understood that the number of channels or the number of memory devices coupled to each channel may be modified in various ways. However, in this specification, for convenience of description, it is assumed that the memory controller 200 is coupled to memory devices through four channels, and four memory devices are coupled to each channel.

In FIG. 4, only operations of memory device_00, memory device_01, memory device_02, and memory device_03, which are coupled to a zeroth channel CH0 will be described. However, it will be understood that the other memory devices (for example, memory device_10 to memory device_33) coupled to the other channels CH1 to CH3 are similarly operated, and thus description of those other memory devices are omitted for convenience of description.

The memory device_00 to the memory device_03 may be commonly coupled to the zeroth channel CH0. The memory device_00 to the memory device_03 may communicate with the memory controller 200 through the zeroth channel CH0. Since the memory device_00 to the memory device_03 are commonly coupled to the zeroth channel CH0, only one memory device among the memory device_00 to the memory device_03 may communicate with the memory controller 200 at a time. However, operations respectively performed in the memory device_00 to the memory device_03 may be simultaneously performed.

The performance of the storage device using a plurality of memory devices can be improved using data interleaving, that is, data communication using the interleaving scheme. The data interleaving using the interleaving scheme may mean performing a data read or write operation while moving between ways in a structure in which two or more ways share one channel. In order to perform the data interleaving, the memory devices may be managed in units of channels and ways. In order to maximize parallelism of memory device coupled to each channel, the memory controller 200 may distribute and allocate consecutive logical memory areas to channels and ways.

For example, the memory controller 200 may transmit a command, a control signal including an address, and data to the memory device_00 through the zeroth channel CH0. While the memory device_00 is programming the transmitted data in a memory cell included therein, the memory controller 200 may transmit a command, a control signal including an address, and data to the memory device_01.

In FIG. 4, the plurality of memory devices may be configured as four ways WAY0 to WAY3. A zeroth way WAY0 may include the memory device_00, the memory device_10, the memory device_20, and the memory device_30. A first way WAY1 may include the memory device_01, the memory device_11, the memory device_21, and the memory device_31. A second way WAY2 may include the memory device_02, the memory device_12, the memory device_22, and the memory device_32. A third way WAY3 may include the memory device_03, the memory device_13, the memory device_23, and the memory device_33.

Each of the channels CH0 to CH3 may be a bus for signals that are shared and used by memory devices coupled to the corresponding channel.

Although FIG. 4 illustrates data interleaving in a four-channel/four-way structure, the efficiency of the data interleaving may be improved when the number of channels and the number of ways increases.

Figure 5:
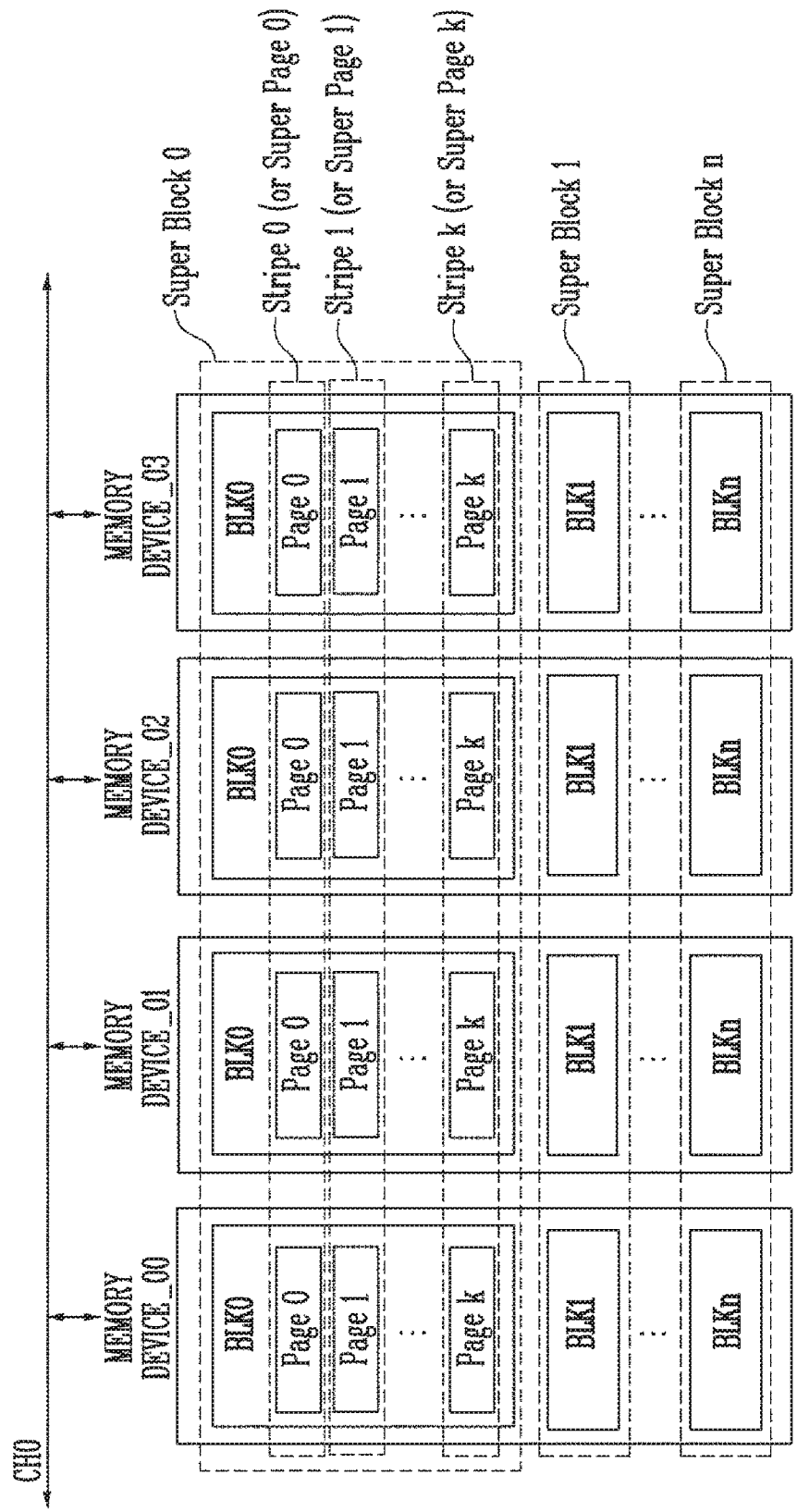
FIG. 5 is a diagram illustrating a concept of a super block, super page or stripe according to an embodiment of the present disclosure.

FIG. 5 is a diagram illustrating a concept of a super block, super page or stripe according to an embodiment of the present disclosure.

Referring to FIG. 5, four memory devices, i.e., memory device_00 to memory device_03 may be commonly coupled to a zeroth channel CH0.

In FIG. 5, each memory device may include a plurality of planes. However, in this specification, for convenience of description, it is assumed that one memory device includes one plane. One plane included in each of the memory devices (the memory device_00 to the memory device_03) may include zeroth to nth memory blocks BLK0 to BLKn, and the one memory block may include zeroth to kth pages Page 0 to Page k.

The memory controller (e.g., the memory controller 200) may control memory blocks (e.g., the memory blocks BLK0 to BLKn) included in a plurality of memory devices (e.g., the memory device_00 to memory device_03) commonly coupled to one channel (e.g., the channel CH0) in units of super blocks. For example, the zeroth memory blocks BLK0 included in the memory device_00 to the memory device_03 may constitute a zeroth super block Super Block 0. Therefore, the memory device_00 to the memory device_03 coupled to the zeroth channel CH0 may include zeroth to nth super blocks Super Block 0 to Super Block n.

One super block may be configured with a plurality of stripes Stripe 0 to Stripe k. The stripe may be used together with the term "super page."

One stripe or super page (e.g., zeroth stripe Stripe 0 or Super Page 0 among the stripes Stripe 0 to Stripe k or Super Page 0 to Super Page k) may include a plurality of pages (e.g., zeroth pages Page 0s among the pages Page 0 to Page k). For example, the zeroth pages Page 0s respectively included in the plurality of zeroth memory blocks BLK0s included in the zeroth super block Super Block 0 may constitute a zeroth stripe Stripe 0 or zeroth super page Super Page 0.

Therefore, zeroth to kth stripes Stripe 0 to Stripe k may be included in one super block. Alternatively, zeroth to kth super pages Super Page 0 to Super Page k may be included in one super block.

When the memory controller stores data in the memory device_00 to the memory device_03 or reads the data from the memory device_00 to the memory device_03, the memory controller 200 may store or read the data in units of stripes or super pages.

Figure 6:
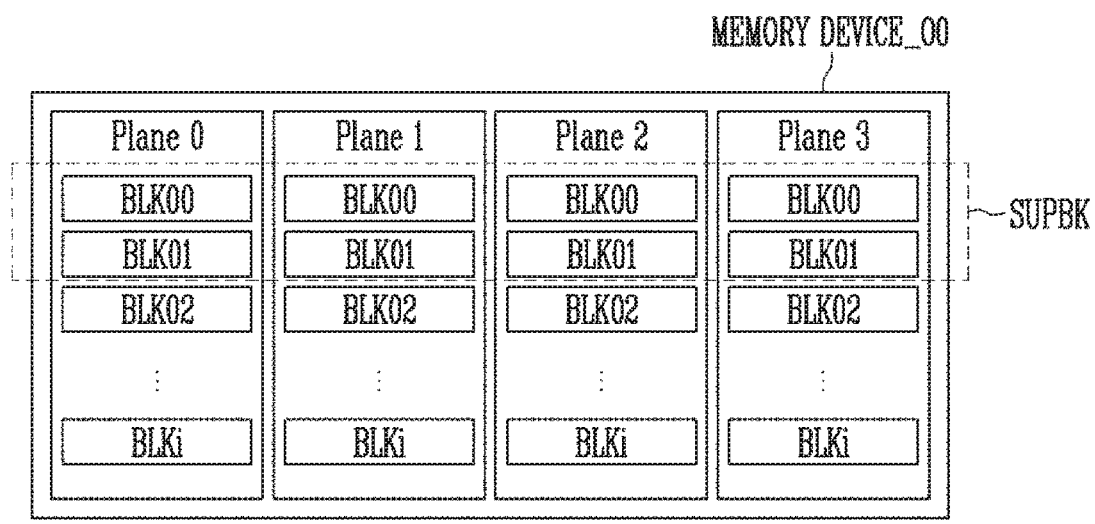
FIG. 6 is a diagram illustrating another embodiment of the super block of FIG. 5 according to an embodiment of the present disclosure.

FIG. 6 is a diagram illustrating another embodiment of the super block of FIG. 5 according to an embodiment of the present disclosure.

Referring to FIG. 6, memory device_00 shown in FIG. 6 may correspond to the memory device_00 among the plurality of memory devices (the memory device_00 to the memory device_33) described with reference to FIG. 4.

The memory device_00 may include a plurality of planes Plane 0 to Plane 3. One plane may include a plurality of memory blocks BLK00 to BLKi (where i is a positive integer). Although FIG. 6 illustrates that the memory device_00 includes four planes Plane 0 to Plane 3, this is for convenience of description, and the number of planes included in one memory device is not limited to the embodiment of FIG. 6.

A plane may be a unit for independently performing a program, read or erase operation. Therefore, the memory device_00 may include, for each plane, the address decoder 121 and the read/write circuit 123, which are described with reference to FIG. 2.

In an embodiment, a super block SUPBK may include at least two memory blocks included in different planes among memory blocks included in a plurality of planes included in one memory device. The memory device_00 that store data in units of super blocks SUPBK may simultaneously perform operations on the plurality of planes Plane 0 to Plane 3 (Multi-Plane Operation).

Figure 7:
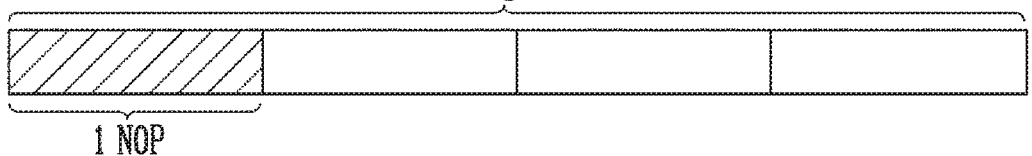
FIG. 7 is a diagram illustrating the concept of a Number of Program (NOP) according to an embodiment of the present disclosure.

FIG. 7 is a diagram illustrating the concept of a Number of Program (NOP) according to an embodiment of the present disclosure.

Referring to FIG. 7, a zeroth page Page 0 represents any one page among the plurality of pages Page 0 to Page k described with reference to FIG. 5.

Any one page, for example the zeroth page Page 0 in FIG. 7, among the plurality of pages Page 0 to Page k may be divided and then programmed. The number of times that any one page is divided and then programmed is referred to as a NOP. For example, if one page stores data through a two-time program, the NOP per page of the corresponding page may be 2. The size of data programmed in an NOP of 1 may be a half of the size of data stored in one page.

In an embodiment, if one page stores data through a four-time program, the NOP per page of the corresponding page may be 4. The size of data programmed in an NOP of 1 may be a ¼ of the size of data stored in one page.

The NOP per page may have a positive integer of 1 or more. In an embodiment, 1 NOP may represent the size of data stored in one page through one-time program. When the NOP per page is 4, data having a size corresponding to the 1 NOP may be stored for every one-time program. Data having a size corresponding to a total of 4 NOP may be stored in one page.

In the particular example shown in FIG. 7, the NOP per page is 4. When assuming that the size of data stored in one page is 16 kilobytes, the size of data corresponding to the 1 NOP may be 4 kilobytes. In an example, the size of the zeroth page Page 0 is 4 NOP. The zeroth page Page 0 is in a state in which one-time program among a total of four times is performed. That is, data corresponding to the 1 NOP is stored in the zeroth page Page 0. Whenever one-time program is performed, the zeroth page Page 0 may store data having a size corresponding to the 1 NOP.

FIG. 8 is a diagram illustrating the memory block state information table, for example, the memory block state information table included in the memory device 100 of FIG. 1.

Referring to FIG. 8, the memory block state information table may include information on states of a plurality of memory blocks included in the memory device. Specifically, the memory block state information table may include information indicating whether each of the plurality of memory blocks is a bad block or a normal block.

For example, a memory block of which state information is "0" may be a normal block, and a memory block of which state information is "1" may be a bad block. In another embodiment, a memory block of which state information is "1" may be a normal block, and a memory block of which state information is "0" may be a bad block.

In FIG. 8, the memory block state information table may include state information of first to zth memory blocks BLK1 to BLKz. Through the memory block state information table of FIG. 8, it can be seen that the third memory block BLK3 corresponds to a bad block.

In an embodiment, the memory block state information table may be included in the system block of the memory device 100 described with reference to FIGS. 1 and 2.

FIG. 9 is a diagram illustrating an NOP of a super block in accordance with an embodiment of the present disclosure.

Referring to FIG. 9, the zeroth super block Super Block 0 may include zeroth to third memory blocks BLK_0 to BLK_3. Although FIG. 9 illustrates that four memory blocks are included in one super block, this is for convenience of description, and the number of memory blocks included in one super block may vary depending on an embodiment.

The memory controller 200 described with reference to FIG. 1 may control memory devices to allocate a super block including a plurality of memory blocks and store data in the allocated super block.

In an embodiment, the memory controller may calculate an NOP of a super block, based on the state information of the memory blocks in the memory block state information table described with reference to FIG. 8.

Specifically, the memory controller may determine a number of memory blocks corresponding to normal blocks among a plurality of memory blocks included in a super block, based on the state information of the memory blocks in the memory block state information table. The memory controller may calculate an NOP of the corresponding super block, based on the determination result.

In an embodiment, the NOP of the super block may be a value obtained by multiplying the number of memory blocks corresponding to normal blocks among the plurality of memory blocks included in the super block and an NOP per memory block. The NOP per memory block may be a value obtained by multiplying a number of pages included in one memory block and an NOP per page.

In various embodiments, the NOP of the super block may be calculated using a number of memory devices coupled to the same channel and a number of planes included in each memory device.

Specifically, the NOP of the super block may be a value obtained by multiplying the NOP per memory block and a value obtained by subtracting a number of bad blocks included in the super block from a value obtained by multiplying a number of memory devices included in the memory blocks included in the super block, a number of planes included in each memory device, and a number of memory blocks included in each plane.

In FIG. 9, when assuming that the number of pages included in one memory block is 128, and the NOP per page is 4, the NOP per memory block is 512. Since 1 NOP represents the size of data stored through one-time program, one memory block may store data having a size corresponding to 512 NOP.

The NOP of the zeroth super block Super Block 0 may be 1536 obtained by multiplying 512 that is the NOP per memory block and 3 that is the number of memory blocks except the first memory block BLK1 corresponding to a bad block. That is, the zeroth super block Super Block 0 may store data having a size corresponding to 1536 NOP.

Figure 10:
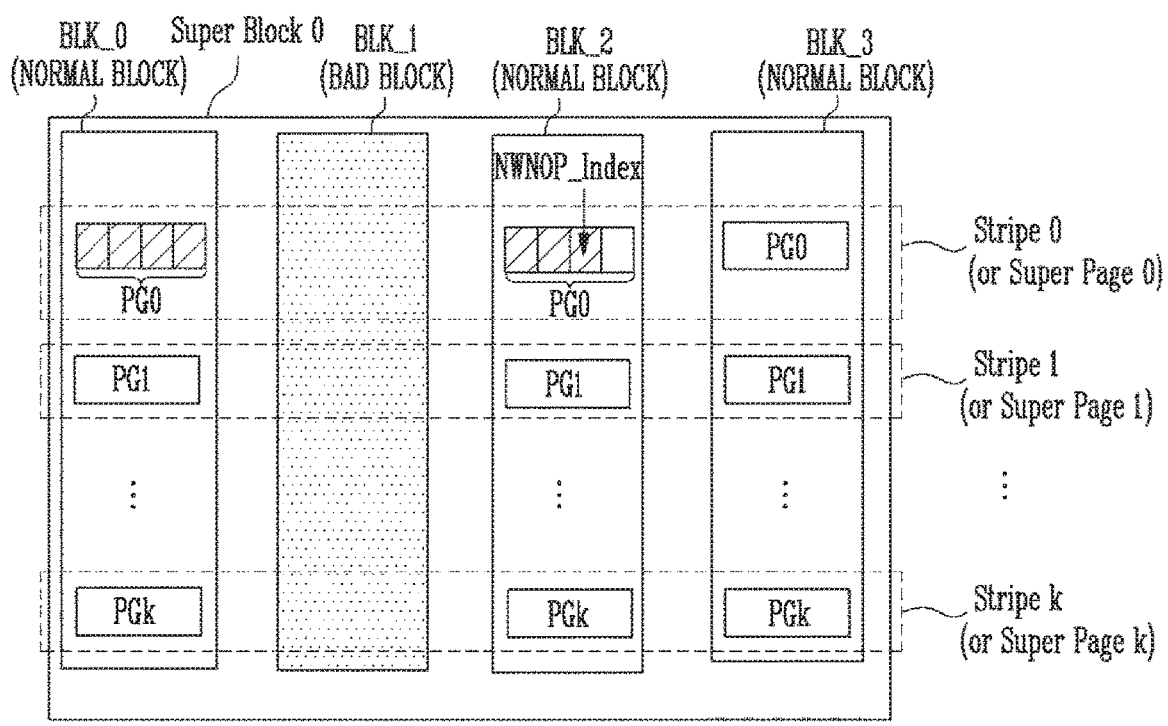
FIG. 10 is a diagram illustrating data write position (NWNOP_Index) in the super block according to an embodiment of the present disclosure.

FIG. 10 is a diagram illustrating data write position NWNOP_Index in the super block according to an embodiment of the present disclosure.

In an embodiment, the memory controller 200 of FIG. 1 may adjust the size of write data to be provided to a plurality of memory devices controlled by the memory controller 200, using an NOP of a super block.

Referring to FIG. 10, the number of memory blocks BLK_0, BLK_2, and BLK_3 corresponding to normal blocks among the memory blocks included in the zeroth super block Super Block 0 is 3. Each memory block includes zeroth to kth pages PG 0 to PGk. The NOP per page is 4. Therefore, the NOP of the zeroth super block Super Block 0 is 12(k+1). The size of data stored in the zeroth super block may correspond to 12(k+1) NOP.

The data write position NWNOP_Index may represent the size of data programmed in the super block in the unit of NOP. FIG. 10 exemplifies the data write position NWNOP_Index having a value of 7 representing 7 NOP corresponding to the size of programmed data in the super block.

The data write position NWNOP_Index may be a total sum of number of program performed on pages included in the super block. For example, the zeroth super block Super Block 0 is in a state in which four-time program is performed on a zeroth page PG0 included in the zeroth memory block BLK_0 and three-time program is performed on a zeroth page PG0 included in the second memory block BLK_2. Therefore, the total sum of numbers of program performed on the pages included in the zeroth super block Super Block 0 corresponds to 7, and hence the data write position NWNOP_Index of the zeroth super block Super Block 0 may have the value of 7.

Figure 11:
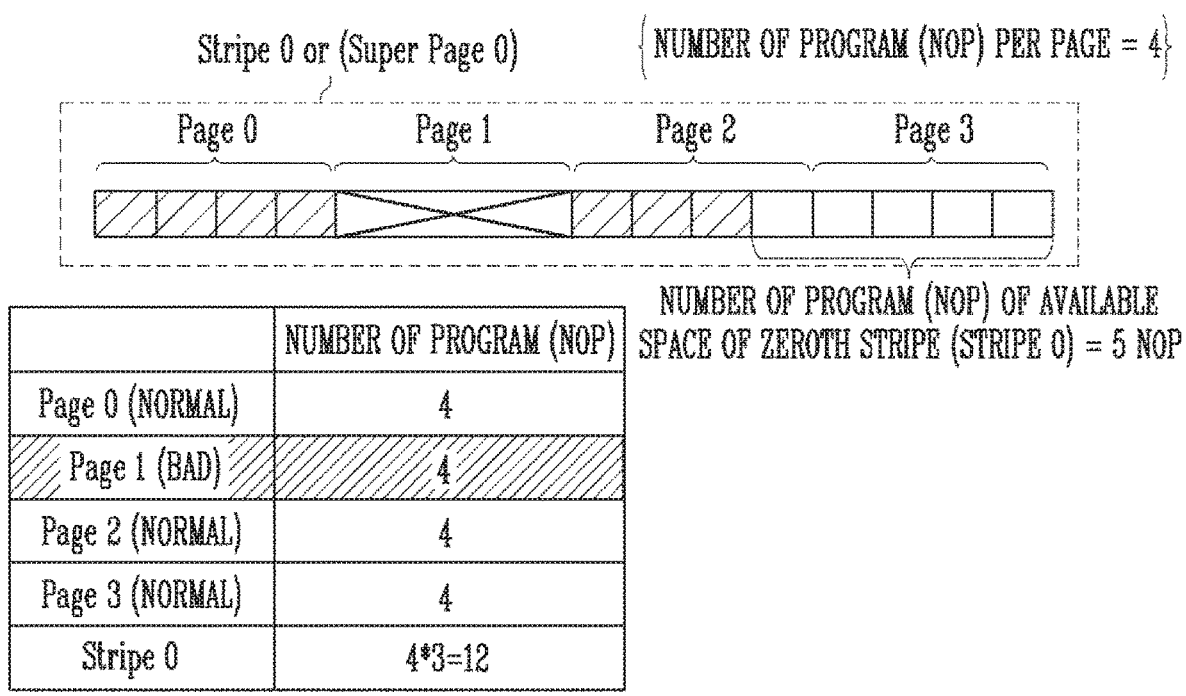
FIG. 11 is a diagram illustrating the size of write data that is data to be stored in a stripe.

FIG. 11 is a diagram illustrating the size of write data that is data to be stored in a stripe according to an embodiment of the present disclosure.

Referring to FIG. 11, a zeroth stripe Stripe 0 represents any one stripe among the plurality of stripes Stripe 0 to Stripe k described with reference to FIG. 10.

The memory controller 200 of FIG. 1 may store data in units of stripes. Specifically, the memory controller 200 may store data in a selected stripe among a plurality of stripes Stripe 0 (or Super Page 0) to Stripe k (or Super Page k). When the selected stripe is full of programmed data, the memory controller may select a next stripe.

The zeroth stripe Stripe 0 may include zeroth to third pages Page 0 to Page 3. Although FIG. 11 illustrates that four pages are included in one stripe, this is for convenience of description, and the number of pages included in one stripe may vary depending on an embodiment.

The NOP of a stripe may be a value obtained by multiplying a number of pages of normal blocks among pages included in the stripe and an NOP per page.

For example, in FIG. 11, the zeroth stripe Stripe 0 includes zeroth to third pages Page 0 to Page 3. The first page Page 1 is a page included in a memory block corresponding to a bad block. The zeroth, second, and third pages Page 0, Page 2, and Page 3 are pages included in a memory block corresponding to a normal block. Therefore, the number of pages of the normal blocks among the pages included in the zeroth stripe Stripe 0 is 3. The NOP per page is 4, and therefore, the size of the zeroth stripe Stripe 0 is 12 NOP.

The NOP of an available space of a stripe may be a value obtained by subtracting the total sum of numbers of program performed in pages included in the stripe from a NOP of the stripe. The total sum of numbers of program performed in the pages included in the stripe may be a remainder obtained by dividing the data write position NWNOP_Index in a super block including the stripe by the NOP of the stripe.

For example, in FIG. 11, when assuming that the data write position NWNOP_Index of a super block including the zeroth stripe Stripe 0 is 7, the remainder obtained by dividing the data write position NWNOP_Index by 12 that is the NOP of the zeroth stripe Stripe 0 may be 7. Therefore, the total sum of numbers of program performed in the pages included in the zeroth stripe Stripe 0 may be 7.

Thus, the NOP of an available space of the zeroth stripe Stripe 0 is 5 NOP that is a value obtained by subtracting 7 that is the total sum of numbers of program performed in the pages included in the zeroth stripe Stripe 0 from 12 that is the NOP of the zeroth stripe Stripe 0.

The memory controller 200 described with reference to FIG. 1 may read the state information of the memory blocks in the memory block state information table stored in the memory device 100, and allocate, as a super block, at least two memory blocks included in different memory devices among the memory blocks included in the plurality of memory devices.

The memory controller may adjust the size of write data that is data to be stored in a selected stripe among a plurality of stripes included in the allocated super block by calculating an NOP of the super block and a data write position NWNOP_Index in the super block. That is, the memory controller may adjust the size of data provided to the selected stripe among the stripes included in the plurality of memory devices controlled by the memory controller.

For example, when assuming that the size of write data to be written, which is requested from the host, corresponds to 9 NOP, the NOP of the available space of the zeroth stripe Stripe 0 is 5 NOP, and hence the memory controller programs data having a size corresponding to 5 NOP in the zeroth stripe Stripe 0. After the program is performed, the memory controller may program, in a next stripe, data having a size corresponding to 4 NOP, which is remaining data.

Figure 12:
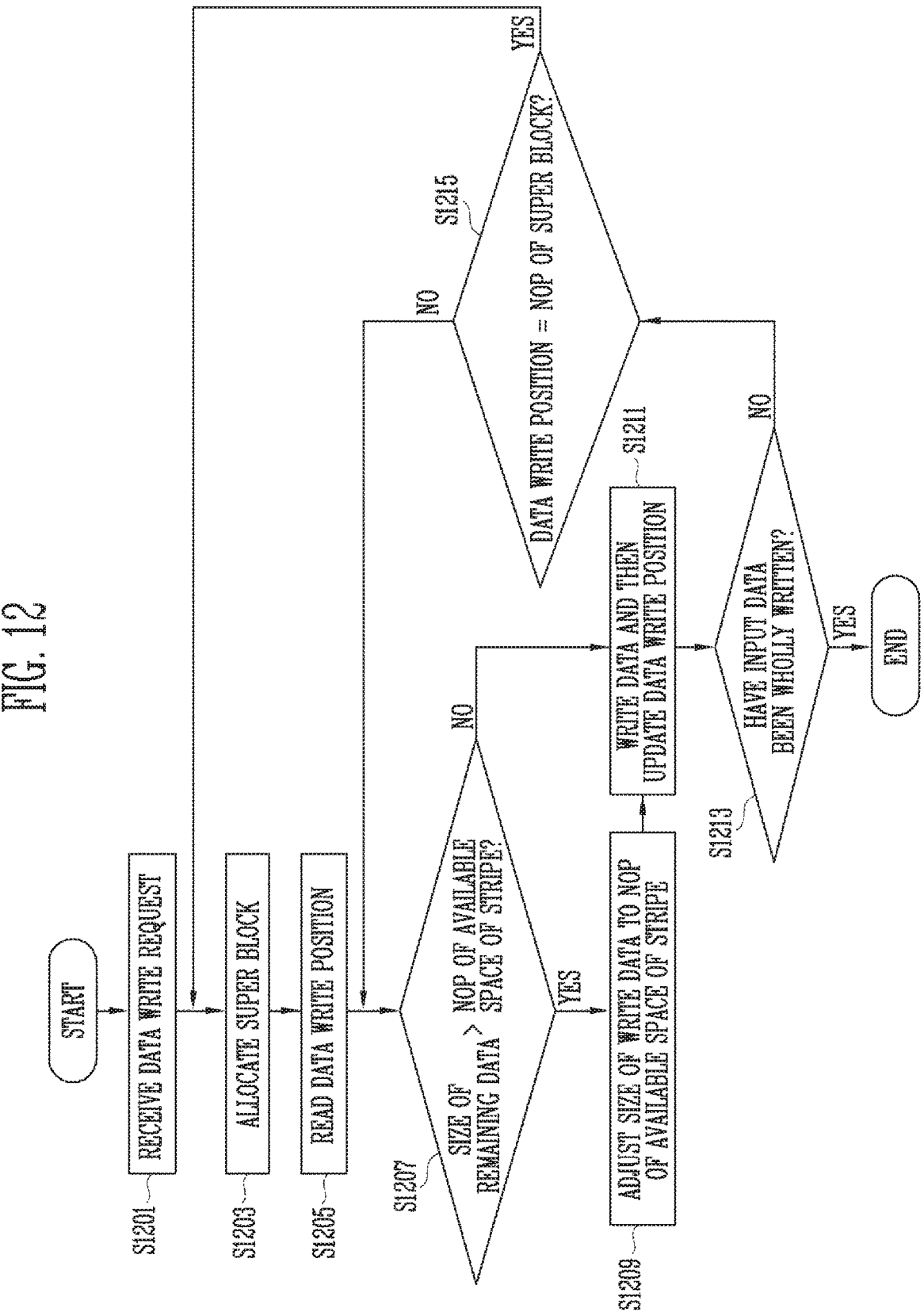
FIG. 12 is a flowchart illustrating an operation of the memory controller according to an embodiment of the present disclosure.

FIG. 12 is a flowchart illustrating an operation of a memory controller according to an embodiment of the present disclosure.

Referring to FIG. 12, in step S1201, the memory controller may receive data write request from a host.

In step S1203, the memory controller may allocate a super block including at least two memory blocks included in different memory devices among a plurality of memory blocks included in a plurality of memory devices.

In step S1205, the memory controller may read a data write position in the allocated super block.

In step S1207, the memory controller may determine whether the size of remaining data is larger than a NOP of an available space of a selected stripe, based on a NOP of the super block and the data write position in the super block. The remaining data is data with which data write is not performed among write data to be written. The write data are provided along with the data write request from the host.

As the determination result, when the size of the remaining data is larger than the NOP of the available space of the stripe (that is, "YES" at step S1207), the memory controller proceeds to step S1209. However, when the size of the remaining data is less than or equal to the NOP of the available space of the stripe (that is, "NO" at step S1207), the memory controller proceeds directly to step S1211.

In an embodiment, the memory controller may calculate an NOP of the allocated super block, based on the state information of the memory block in the memory block state information table.

In the step S1209, when the size of the remaining data is larger than the NOP of the available space of the stripe as the determination result in the step S1207, the memory controller may adjust the size of the write data to the NOP of the available space of the stripe. For example, when assuming that the size of write data corresponds to 9 NOP and the NOP of the available space of the selected stripe is 5 NOP, the memory controller programs data having a size corresponding to 5 NOP in the selected stripe. As such, the memory controller may adjust the size of write data to the NOP of the available space of the stripe. After the program is performed, the memory controller may program the remaining data having a size corresponding to 4 NOP in a next stripe.

In the step S1211, the memory controller may perform a data write operation on the whole or a portion of the remaining data in the available space of the selected stripe and then update the data write position in the super block.

In an embodiment, the memory controller may provide the whole or a portion of the remaining data to the plurality of memory devices controlled by the memory controller so as to be suitable for the size of the available space of the selected stripe.

In step S1213, the memory controller may determine whether the input data that are data to be written, which are requested from the host, have been wholly written. As the determination result, when the input data are wholly written (that is, "YES" at step S1213), the memory controller stops the operation and may be terminated. However, when the input data are not wholly written (that is, "NO" at step S1213), the memory controller proceeds to step S1215.

In the step S1215, the memory controller may determine whether the data write position in the super block is equal to the size of the allocated super block. As the determination result, when the data write position in the super block is equal to the size of the allocated super block (that is, "YES" at step S1215), the memory controller proceeds to the step S1203. However, when the data write position in the super block is not equal to the size of the allocated super block (that is, "NO" at step S1215), the memory controller proceeds to the step S1207.

Figure 13:
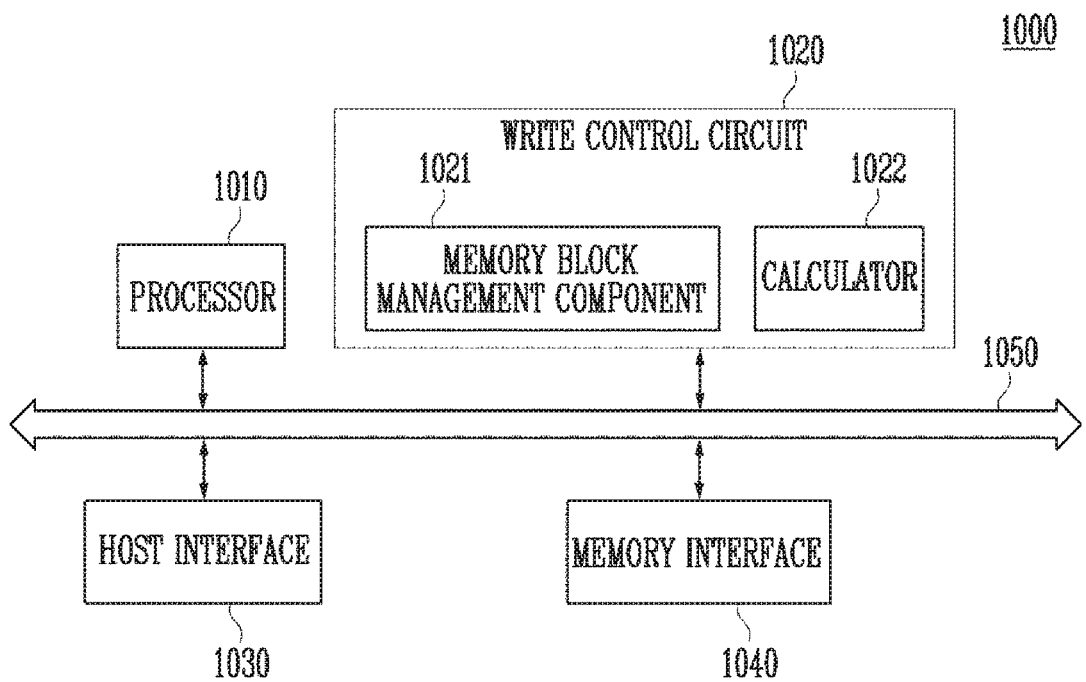
FIG. 13 is a diagram illustrating another embodiment of the memory controller of FIG. 1.

FIG. 13 is a diagram illustrating another embodiment of the memory controller. The memory controller 1000 of FIG. 13 may correspond to the memory controller 200 of FIG. 1.

The memory controller 1000 is coupled to a host (e.g., host 300 of FIG. 1) and a memory device (e.g., memory device 100 of FIG. 1). The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

Referring to FIG. 13, the memory controller 1000 may include a processor 1010, a write control circuit 1020, a host interface 1030, a memory interface 1040, and a bus 1050.

The processor 1010 may control overall operations of the memory controller 1000, and perform a logical operation. The processor 1010 may communicate with the external host through the host interface 1030, and communicate with the memory device through the memory interface 1040.

The processor 1010 may perform a function of a flash translation layer (FTL). The processor 1010 may translate a logical block address (LBA) provided by the host through the FTL into a physical block address (PBA). The FTL may translate an LBA input using a mapping table into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The write control circuit 1020 may include a memory block management component 1021 and a calculator 1022. The write control circuit 1020 may control the calculator 1022 to calculate a parameter required to adjust the size of write data, based on the state information of the memory blocks in the memory block state information table that the memory block management component 1021 reads from the memory device 100 of FIG. 1.

The memory block management component 1021 may allocate a super block including at least two memory blocks included in different memory devices among a plurality of memory blocks included in a plurality of memory devices.

The memory block management component 1021 may read the state information of the memory blocks in the memory block state information table stored in the memory device 100 of FIG. 1. The memory block state information table may include information indicating whether each of the plurality of memory blocks included in the memory devices is a bad block or a normal block. The bad block is a memory block in which data cannot be programmed. In an example, the bad block may be a memory block determined as a defect block in a manufacturing process.

The calculator 1022 may calculate a parameter for adjusting the size of write data to be written into a stripe. The parameter for adjusting the size of write data may be one or more among a NOP of a super block allocated to write data, a NOP of an available space of a selected stripe, and a data write position NWNOP_Index of FIG. 10 in the allocated super block.

In order to calculate the data write position in the allocated super block, the calculator 1022 may read the data write position in the allocated super block, and update the data write position after data is written. Whenever the memory block management component 1021 allocates a super block in which data is to be written, the calculator 1022 may read a data write position in the corresponding super block.

The host interface 1030 may communicate with the external host under the control of the processor 1010. The host interface 1030 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The memory interface 1040 is configured to communicate with the memory device under the control of the processor 1010. The memory interface 1040 may communicate a command, an address, and data with the memory device through a channel.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1040.

The bus 1050 may be configured to provide channels between components of the memory controller 1000.

In an example, the bus 1050 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be coupled to the write control circuit 1020, the host interface 1030, and the memory interface 1040. The control bus may be coupled to the processor 1010, the write control circuit 1020, the host interface 1030, and the memory interface 1040.

Figure 14:
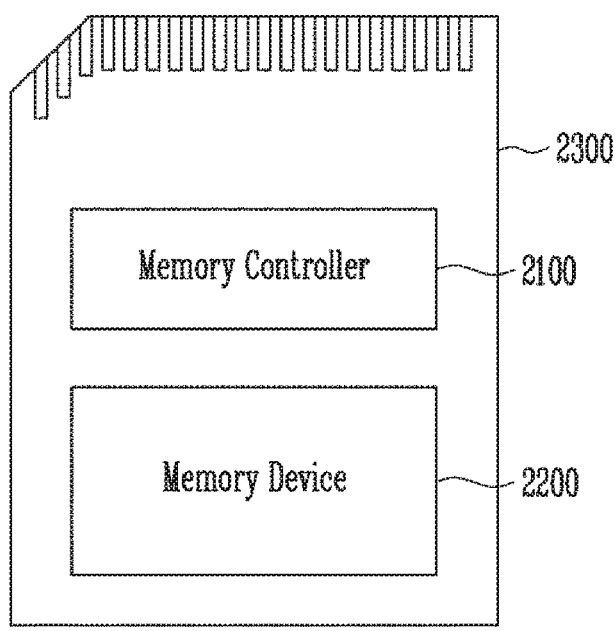
FIG. 14 is a block diagram illustrating a memory card system to which the storage device is applied according to an embodiment of the present disclosure.

FIG. 14 is a block diagram illustrating a memory card system to which the storage device is applied according to an embodiment of the present disclosure.

Referring to FIG. 14, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory controller 2100 may be implemented identically to the memory controller 200 described with reference to FIG. 1.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), Multi-Media Card (MMC) an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), fire e, a Universal Flash Storage (UFS), Wi-Fi, Bluetooth, and NVMe.

In an example, the memory device 2200 may be implemented with various nonvolatile memory devices such as an Electrically Erasable and Programmable ROM (EPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 15:
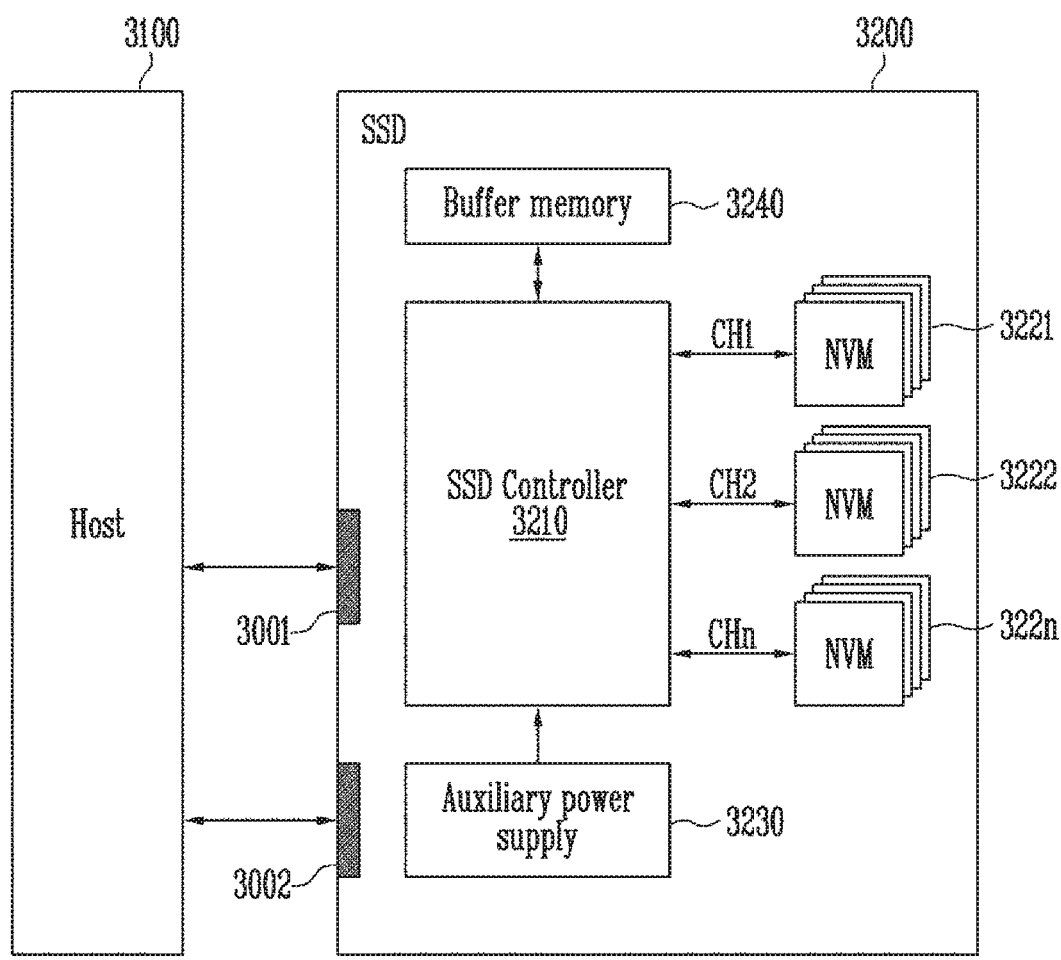
FIG. 15 is a block diagram illustrating a Solid State Drive (SSD) system to which the storage device is applied according to an embodiment of the present disclosure.

FIG. 15 is a block diagram illustrating a Solid State Drive (SSD) system to which the storage device is applied according to an embodiment of the present disclosure.

Referring to FIG. 15, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322*n*, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322*n* in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), Multi-Media Card (MMC) an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322*n*, or temporarily store meta data (e.g., a mapping table) of the flash memories 3221 to 322*n*. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 16:
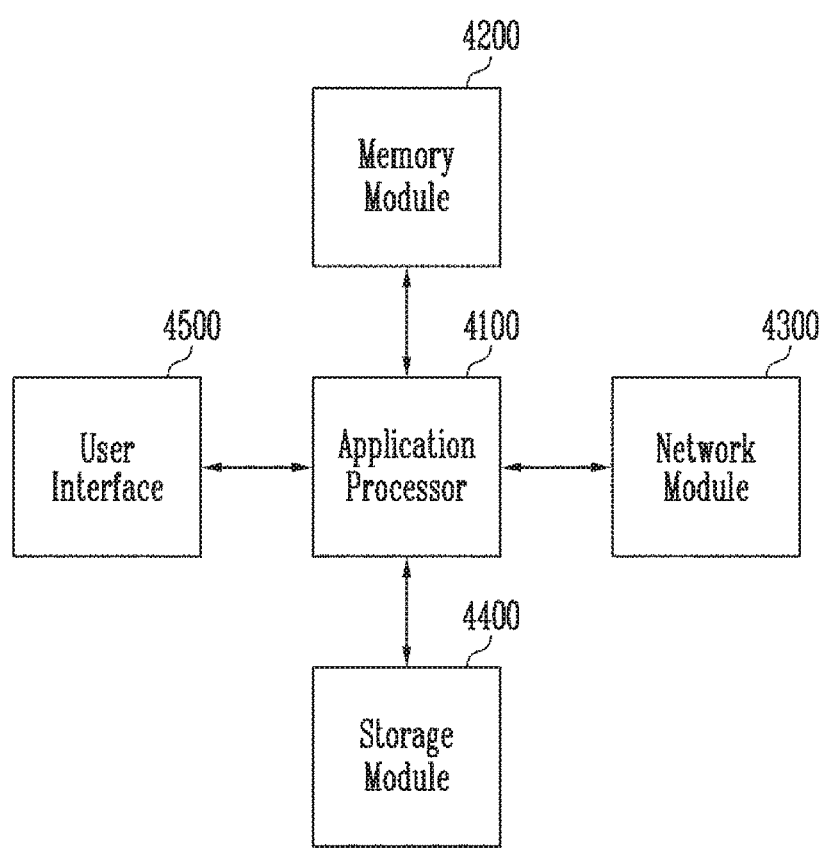
FIG. 16 is a block diagram illustrating a user system to which the storage device is applied according to an embodiment of the present disclosure.

FIG. 16 is a block diagram illustrating a user system to which the storage device is applied according to an embodiment of the present disclosure.

Referring to FIG. 16, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or volatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), WIMAX, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

For example, the storage module 4400 may include a plurality of nonvolatile memory devices, and the plurality of nonvolatile memory devices may operate identically to the memory device 100 described with reference to FIG. 2. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

According to the present disclosure, there can be provided a storage device having an improved operation speed and an operating method thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A storage device comprising:
a plurality of memory devices each including a plurality of memory blocks; and
a memory controller configured to allocate a super block including at least two memory blocks included in different memory devices among the plurality of memory blocks, calculate parameters required to adjust a size of write data in a unit of Number of Program (NOP), which corresponds to a number of times that one page is divided and then programmed, and adjust the size of the write data that is data to be stored in a selected stripe among a plurality of stripes included in the super block, based on the parameters,
wherein the parameters include an NOP of the super block, a data write position in the super block, and an NOP of an available space of the selected stripe.

2. The storage device of claim 1, wherein, the memory controller controls the plurality of memory devices according to an interleaving scheme.

3. The storage device of claim 1, wherein the memory controller reads state information in a memory block state information table indicating whether each of the plurality of memory blocks is a bad block or a normal block.

4. The storage device of claim 2, wherein the state information in the memory block state information table is stored as a bit map in a memory device.

5. The storage device of claim 3, wherein the memory controller includes a write control circuit configured to adjust the size of the write data,
wherein the write control circuit includes:
a memory block management component configured to allocate the super block and read the state information in the memory block state information table; and
a calculator configured to calculate the parameters, based on the state information in the memory block state information table.

6. The storage device of claim 5, wherein the NOP of the super block is an NOP corresponding to the size of all memory blocks corresponding to normal blocks among the plurality of memory blocks included in the super block, based on the state information in the memory block state information table.

7. The storage device of claim 5, wherein the data write position in the super block is an NOP corresponding to the size of data programmed in the super block or the total sum of numbers of program performed on pages included in the super block.

8. The storage device of claim 5, wherein, when the data write position in the super block is equal to the NOP of the super block, the memory block management component allocates a super block other than the super block that is already allocated.

9. The storage device of claim 5, wherein the write control circuit adjusts the size of the write data, based on a result obtained by comparing the size of remaining data with the NOP of the available space of the selected stripe,
wherein the remaining data is data on which data write operation is not performed among input data that is data to be written, which is requested from a host.

10. The storage device of claim 9, wherein, when the size of the remaining data is larger than the NOP of the available space of the selected stripe, the write control circuit adjust the size of the write data to the NOP of the available space of the selected stripe.

11. A memory controller comprising:
a memory interface configured to communicate data with a plurality of memory devices each including a plurality of memory blocks; and
a write control circuit configured to allocate a super block including at least two memory blocks included in different memory devices among the plurality of memory blocks, calculate parameters required to adjust a size of write data in a unit of Number of Program (NOP), which corresponds to a number of times that one page is divided and then programmed, and adjust the size of the write data that is data to be stored in a selected stripe among a plurality of stripes included in the super block, based on the parameters,
wherein the parameters include an NOP of the super block, a data write position in the super block, and an NOP of an available space of the selected stripe.

12. The memory controller of claim 11, wherein the write control circuit reads state information in a memory block state information table indicating whether each of the plurality of memory blocks is a bad block or a normal block.

13. The memory controller of claim 12, wherein the write control circuit includes:
a memory block management component configured to allocate the super block and read the state information in the memory block state information table; and
a calculator configured to calculate the parameters, based on the state information in the memory block state information table.

14. The memory controller of claim 13, wherein the NOP of the super block is an NOP corresponding to the size of all memory blocks corresponding to normal blocks among the plurality of memory blocks included in the super block, based on the state information in the memory block state information table.

15. The memory controller of claim 13, wherein the write control circuit adjusts the size of the write data, based on a result obtained by comparing the size of remaining data with the NOP of the available space of the selected stripe,
wherein the remaining data is data on which data write operation is not performed among input data that is data to be written, which is requested from a host.

16. A method for operating a memory controller for controlling a plurality of memory devices each including a plurality of memory blocks, the method comprising:

allocating a plurality of super blocks each including at least two memory blocks included in different memory devices among the plurality of memory blocks;

calculating a Number of Program (NOP) of the super block, a data write position in the super block, and an NOP of an available space of a selected stripe among a plurality of stripes included in the super block; and adjusting a size of write data that is data to be stored in the selected stripe the NOP of the super block, the data write position in the super block, and the NOP of the available space of the selected stripe, wherein the NOP is a number of times that one page is divided and then programmed.

17. The method of claim 16, wherein the calculating comprises calculating the NOP of the super block, the data write position in the super block, and the NOP of the available space of the selected stripe, based on state information in a memory block state information table indicating whether each of the plurality of memory blocks is a bad block or a normal block.

18. The method of claim 17, further comprising, when the data write position in the super block is equal to the NOP of the super block, allocating a super block other than the super block that is already allocated.

19. The method of claim 17, wherein, in the adjusting of the size of the write data, the size of the write data is adjusted, based on a result obtained by comparing the size of remaining data with the NOP of the available space of the selected stripe, wherein the remaining data is data on which data write operation is not performed among input data that is data to be written, which is requested from a host.

* * * * *